June 14, 1960
F. C. BELL ET AL
2,940,172
ANGLE SETTING DEVICE
Filed April 18, 1949
4 Sheets-Sheet 1
Fig. 1
Fig. 4
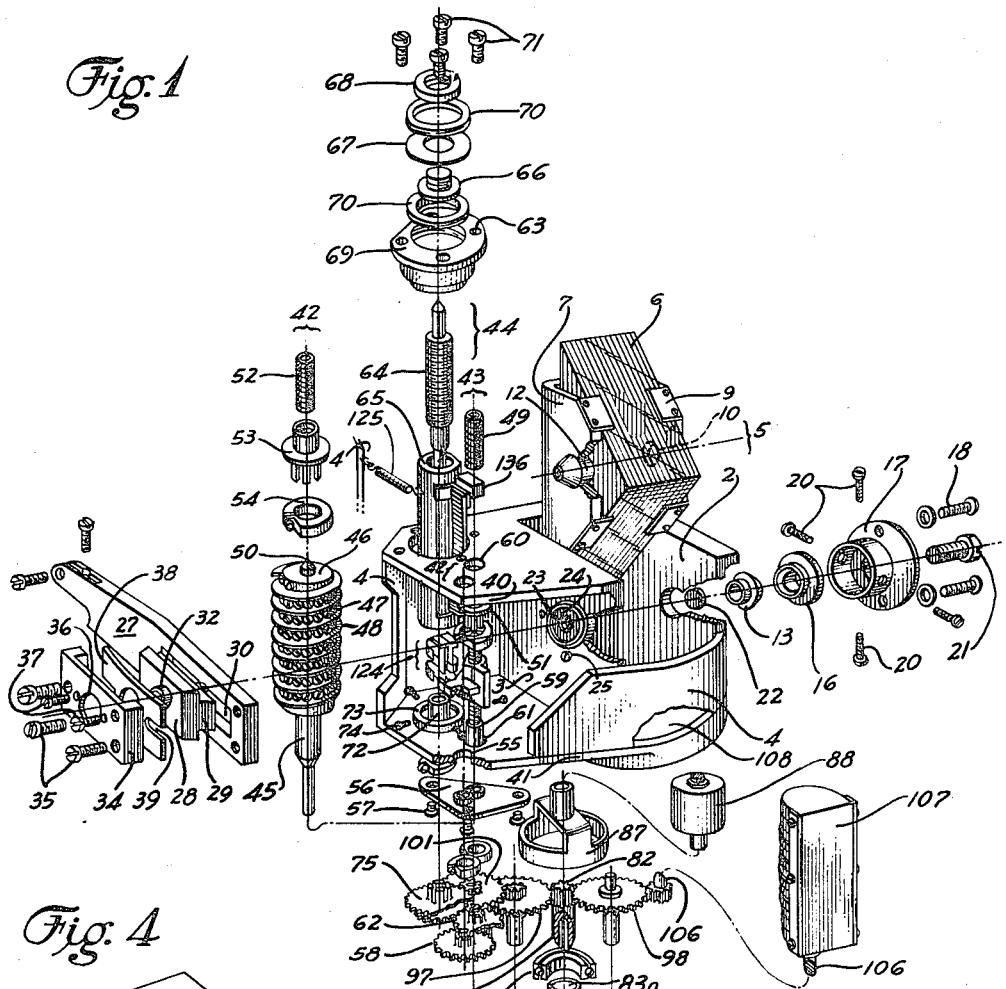
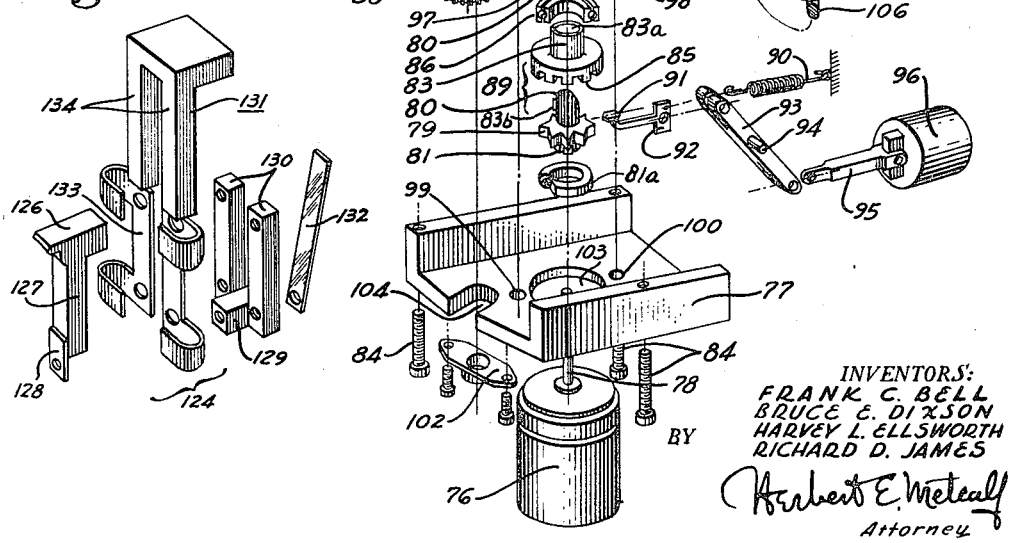
INVENTORS:
FRANK C. BELL
BRUCE E. DIXSON
HARVEY L. ELLSWORTH
RICHARD D. JAMES
BY Herbert E. Metcalf
Attorney June 14, 1960  F. C. BELL ET AL  2,940,172
ANGLE SETTING DEVICE
Filed April 18, 1949  4 Sheets-Sheet 2

INVENTORS:
FRANK C. BELL
BRUCE E. DIXSON
BY HARVEY L. ELLSWORTH
RICHARD D. JAMES

Herbert E. Metcalf
Attorney

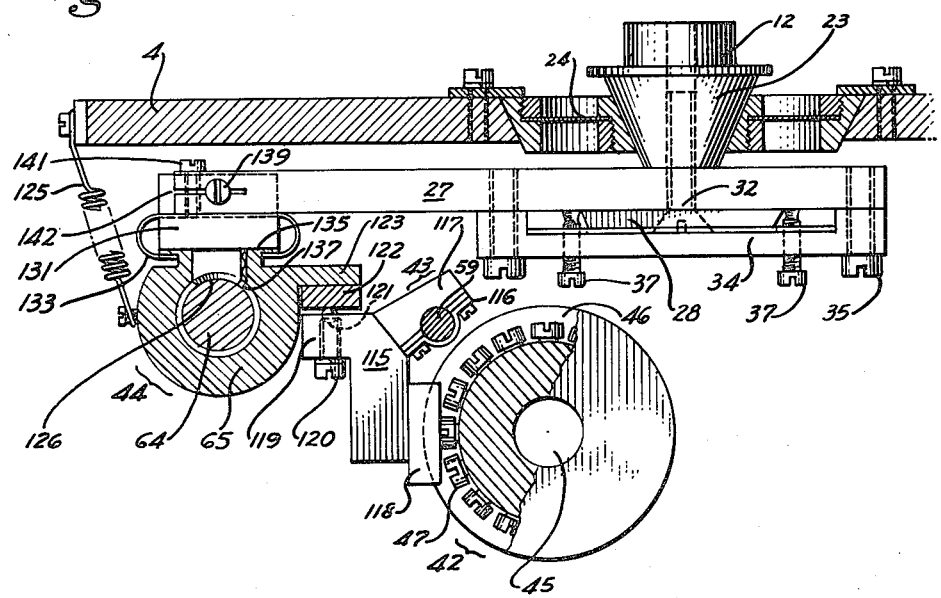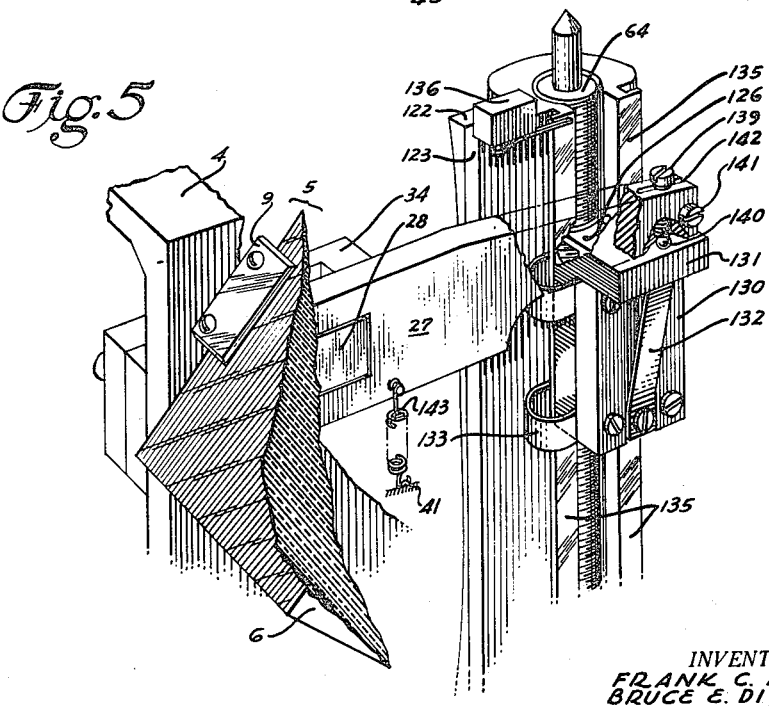

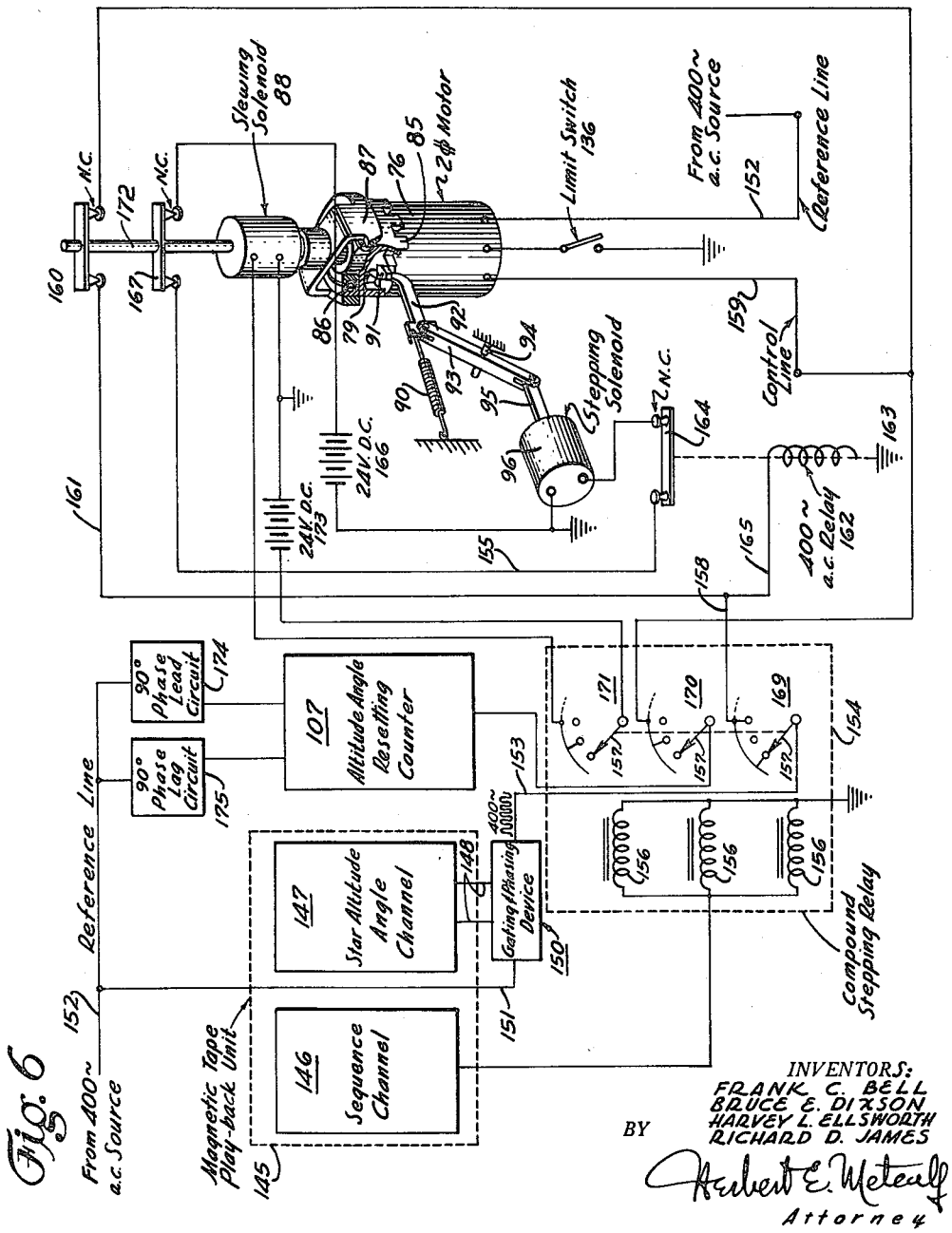

United States Patent Office 2,940,172
Patented June 14, 1960

2,940,172

ANGLE SETTING DEVICE

Frank C. Bell, Sherman Oaks, Bruce E. Dixson and Harvey L. Ellsworth, Hawthorne, and Richard D. James, Long Beach, Calif., assignors to Northrop Corporation, Hawthorne, Calif., a corporation of California Filed Apr. 18, 1949, Ser. No. 88,148

24 Claims. (Cl. 33—61)

This invention relates to angle setting devices and more particularly to a novel means and method of precisely laying off the angle of the specified horizontal plane with respect to a stellar line as desired in a celestial navigation system.

One of the basic problems of implementing a particular system for automatic navigation of a craft by reference to the stars is to physically establish on the craft the specified horizontal platform with respect to star lines.

In accordance with the theory of celestial navigation, it can be shown that if the height of an aircraft of moderately high speed be held nearly constant by an altimeter, for example, then its motion in a trajectory between two points above the earth's surface can be uniquely specified, as a function of time, in terms of the direction of a plumb-bob carried on board.

The direction of the plumb-bob can be specified by angular reference to two stars, e.g.; the angles between the projected plumb-bob line, or apparent zenith, and the lines to the stars. The complements of these angles are the apparent star altitude angles and they specify the parallel planes in space which are normal to the plumb-bob.

It can also be shown that for any given trajectory and time-schedule these apparent star altitude angles at every instant of flight can be computed from available astronomical data. In accordance with this invention, then, these computed results are to be produced, or reproduced, on board a craft during flight, and fed into angle setting devices which lay down the specified apparent horizontal platform with respect to a pair of star lines established on board by automatic star tracking telescopes, for instance. The star altitude angle setting device of the present invention thus determines the orientation of the specified apparent horizontal plane whose normal gives the direction of the specified plumb-bob or the specified apparent gravity vertical needed for celestial navigation.

Among the objects of this invention are:

(a) To provide a novel means and method of translating precomputed signals into incremental angles mechanically laid off between a star tracker and a specified apparent horizontal platform.

(b) To provide a star angle setting device and drive ideally adapted for laying off in precise increments the angle of the specified apparent horizontal with respect to a stellar line.

(c) To provide a novel means and method of correcting errors due to optical and mechanical misalignments.

(d) To provide a novel means and method of coping with screw thread irregularities.

(e) To provide a novel means and method of stepping off small discrete increments of angular rotation in response to an externally applied signal.

(f) To provide a novel means and method of effecting a continuous major angular rotation in response to the proper external signal.

Briefly the invention comprises a motor actuated pivoted element operating on the principle of a sine bar together with an adjusting lead screw and related cam which precisely control extremely minute changes and correct for inherent inaccuracies in angular settings. The motor driven sine bar provides a means for either stepping off small incremental angles on a pivoted member associated therewith; or changing the angle of the member in one operation from one position to another with extreme accuracy, such as an angular second or fraction thereof, in accordance with predetermined data mechanically stored and subsequently transmitted to it.

This invention can be more fully understood by reference to the drawings in which:

Figure 1 is an exploded assembly view of a preferred embodiment of the invention for setting the altitude angle of a prism.

Figure 3 is a partly cross sectional view of the lead screw and cam correcting mechanism.

Figure 4 is an exploded view of the carriage assembly on the lead screw.

Figure 5 is a cut away view showing how the controlled motion is transmitted from the lead screw to the prism.

Figure 6 is a control circuit for the embodiment of the invention as shown in Figure 1.

Figure 7:
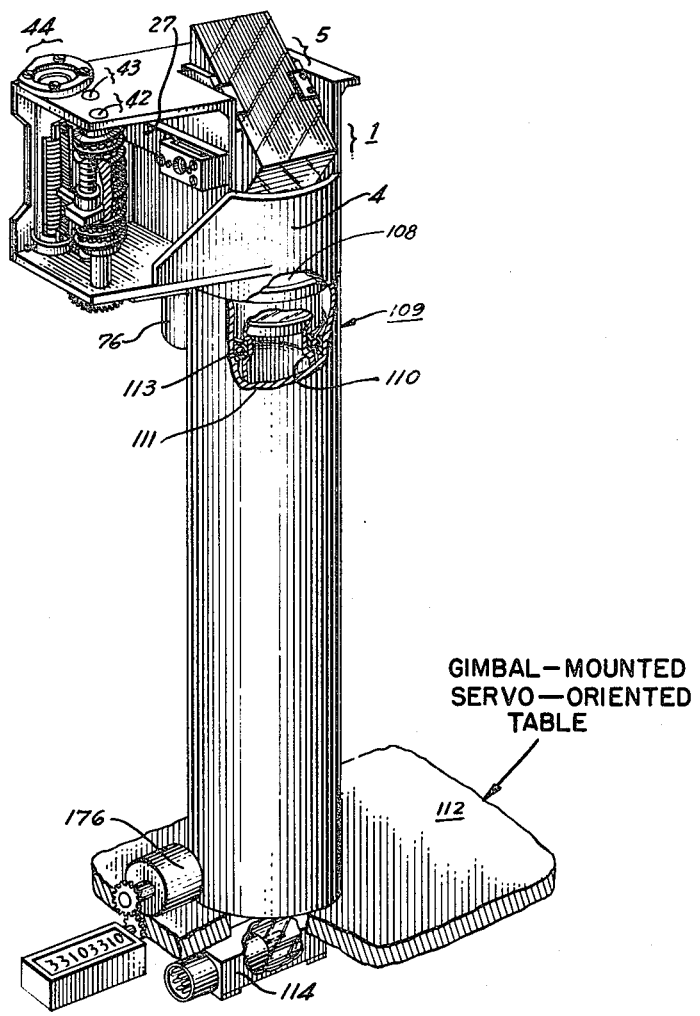
Figure 7 is an assembled perspective view of the invention mounted on a telescope as required for celestial navigation.

Referring first to Figure 1, an exploded view of the angle setting device 1 is shown. Angle generator housing 4 is the frame to which all other parts are attached. Between the right side wall 2 of housing 4 and a parallel central partition 3, a dove prism assembly 5 is mounted. Prism assembly 5 consists of a dove prism 6 that has two 35° angles and is mirrored on its back side, and a channel shaped prism holder 7 that fits around the mirrored back and sides of the prism and is held onto the front optical surfaces by four clips 9. Trunnion holes 10 are provided on either side of prism holder 7 for trunnions 12 and 13 which are pressed therein for mounting the prism assembly 5 on a horizontal axis.

The method of mounting the prism assembly 5 in its bearings provides adjustments for axial preloading and radial alignment. Right trunnion 13 has a conical shaped pivot end which is journalled in a mating bearing 16. Bearing 16 is adjustably mounted in a bearing holder 17 which is attached to housing 4 by bearing holder screws 18. Four bearing adjusting screws 20 radially position the bearing 16 in the bearing holder 17. A right trunnion screw 21 passes through the enlarged axial hollow centers of the bearing holder 17 and bearing 16, and engages in an axial threaded hole in the right trunnion 13 to bear against a loosely enclosed pad assembly 22 in contact with the prism 6. Pad assembly 22 is a metal disc together with a resilient material such as felt for lining the surface contacting the glass prism. This provides a convenient means for taking up any clearance between the glass prism 6 and the prism holder 7; and furthermore, provides a frictional locking means for having the prism 6 rigidly rotate at all times with the prism holder 7.

The left trunnion bearing mount for the prism, shown in Figure 1 assembled in position on the central partition 3, provides a flexible, self-aligning feature. There a bearing cup 23 is flexibly mounted in the center of a flexible diaphragm 24 whose outer edge is fixed to central partition 3 by assembly screws 25. Bearing cup 23, although fairly rigid radially, can be tipped from side to side against the spring loading of its support. This tipping, therefore, ensures full bearing of cup 23 and the coned end of left trunnion 12 in the event of slight eccentricities of the trunnion 12 with respect to the rotating axis due to machining or assembly of the parts.

The radius arm 27 of the prism 6, although shown in Figure 1 to the left of the housing 4 for clarity, is rigidly attached to the left trunnion 12 and in assembly is positioned on the opposite side of the partition 3 from the prism assembly 5. The radius arm 27 is rendered adjustable in length by a sliding member 28 which has a tongue 29 that engages in a slot 30 running lengthwise in the pivot end of the radius arm 27. The length of the slot 30 is obviously greater than the length of the tongue 29. Left trunnion screw 32 passes through a hole in the center of the sliding member 28 to engage the threads provided in the axial hole of the left prism trunnion 12. This locks the radius arm to the prism.

A means for easily making minute changes in the length of the radius arm 27; i.e., adjusting the position of the tongue 29 of the sliding member 28 in the slot 30 of the radius arm 27, is obtained by machining the ends of the sliding member 28 at an angle, and providing a cap 34 which spans the sliding member 28 and the slot 30 on the radius arm and is attached to the radius arm by screws 35. On either side of a clearance hole 36 on the cap 34 an arm adjusting screw 37 is provided. When advanced these screws bear on the angled ends of the sliding member 28. By advancing one of the arm adjusting screws 37 and backing off on the other, the sliding member 28 is caused to be moved with respect to the radius arm 27 thus adjusting its length. A leaf spring 38, with clearance slots 39 for the arm adjusting screws 37, is provided for holding the arm 27 against the ways of the sliding member 28.

On the left of housing 4 between the top 40 and bottom 41 thereof three parallel axes of rotation are provided for, to accommodate the calibration cam assembly 42, the jack screw assembly 43, and the lead screw assembly 44, from the front to back respectively of housing 4. These axes of rotation are all vertical; i.e., perpendicular to the prism 6 horizontal rotating axis.

The calibration cam assembly 42, shown displaced just to the left of the housing 4 for clarity, comprises a cam shaft 45 surrounded by a helically channeled barrel 46. Radial button head screws 47 are positioned adjacent to each other at the bottom of the helical channel 48 for the entire length of its path. The function of the radial screws 47 will be explained later. The top end 50 of the cam shaft 45 is conical and when assembled is journalled in the chamfered hollow bottom of a cam journal screw 52. Flanged cam sleeve 53 is press-fitted in housing top 40 with its flange contacting the inside lower surface of the housing top 40. Cam sleeve 53 is provided with an internally threaded hole through which the cam journal screw 52 passes until its internally chamfered hollow end bears on the conical top 50 of the cam shaft.

A collet arrangement for locking the cam journal screw 52 in the desired position is made by fluting the lower end of cam sleeve 53 and providing a cam clamping washer 54 which squeezes the flutes against the cam journal screw 52. The lower end of the cam shaft 45 passes through an enlarged hole 55 in the housing bottom 41 and also extends downwardly through a hole in a journal plate 56 in which it bears. Journal plate 56 is attached beneath the housing bottom 41 by three plate screws 57.

On the lower end of cam shaft 45 a cam gear 58 is attached. The hub of cam gear 58 is held to the cam shaft 45 by a collet clamping arrangement as previously described.

Jack screw 59 is mounted in the housing 4 in a manner analogous to the cam shaft 45. It is positioned, as shown, on the axis determined by holes 60 and 61 in the housing top 40 and bottom 41 respectively being mounted in housing top 40 by means of a journal screw 49 and a sleeve 51. The jack screw is also journalled in the journal plate 56 and has a jack screw drive gear 62 attached to its lower end.

The lead screw assembly 44 is mounted in the housing 4 in a manner analogous to the prism assembly 5 mountings. The lead screw assembly includes, in addition to lead screw 64, a thread barrel 65 which encircles the lead screw 64 and is independently rotatable about the same axis. As seen in the exploded view of the upper mounting for the lead screw 64, lead screw bearing cup 66 is supported by passing a threaded portion thereof through the center of a flexible annular diaphragm 67; a bearing cup nut 68 then engages this threaded portion to hold the lead screw bearing cup in position. The annular diaphragm 67, in turn, is held along its outer periphery in lead screw bearing housing 69 by means of diaphragm nuts 70. The lower end of lead screw bearing housing 69, although permitting the lead screw to pass freely therethrough, provides a beveled bearing surface for the thread barrel 65. Holding screws 71 pass through holes 63 in the flange of lead screw bearing housing 69 to secure it to housing top 40.

The lower end of lead screw 64 is also provided with a radial adjustment mounting analogous to that provided for the prism assembly. Lower lead screw bearing 72, in which the pivoted lower end of lead screw 64 is journalled, rests on the lead screw bearing mount 73 which positions the lead screw bearing for axial alignment of the lead screw by adjusting screws 74. Lead screw bearing mount 73 also provides a chamfered bearing surface for the lower end of thread barrel 65. The lead screw 64 extends downwardly through housing bottom 41 and has a lead screw gear 75 attached thereon by the collet clamping arrangement previously described.

As can be noted, by referring to Figure 1, the lead screw gear 75, which is a compound gear, drives the jack screw gear 62. The jack screw gear 62, which is also a compound gear, in turn drives the cam gear 58, the gearing in each case giving a reducing turn ratio.

The drive motor and escapement assembly will next be described. A two phase motor 76 provides the power for driving the angle generator gear train. Motor 76 is positioned below an escapement housing 77 and is fitted in a hole 103 provided in the bottom thereof through which its drive shaft 78, upwardly extends. A star wheel pinion 79 provided with an integral hollow shaft 80 fits over the end of motor shaft 78 and is held thereon by the collet arrangement 81 and clamping washer 81a.

The upper end of star wheel shaft 80 is machined to form the drive pinion 82 for the gear train. The escapement assembly 89 consists of the star wheel pinion 79 and shaft 80 as described and a sleeve 83 which has a slidable fit on the star wheel pinion shaft 80 and is keyed by key 83b affixed to shaft 80, and key way 83a in sleeve 83 thereto to be rotatable therewith. An internal star wheel 85 is integral with the lower end of sleeve 83. The inner race of a ball bearing 86 is press fitted to encircle the sleeve 83, and the outer race of ball bearing 86 is staked inside the skirt of a yoke 87. This arrangement enables the escapement star wheel pinion 79 and internal star wheel 85 to be rotatable with respect to yoke 87. Yoke 87 has a shaft on the top thereof by which it is connected to a slewing solenoid 88.

In operation, yoke 87 causes internal star wheel 85, which normally encircles star wheel pinion 79 so that their teeth are in the same plane, to be lifted out of the plane whenever the slewing solenoid 88 becomes actuated for reasons which will be explained hereafter.

Figure 2:
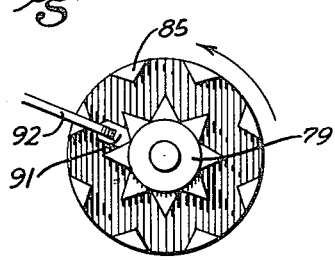
Figure 2 is a detail plan view showing the configuration of the escapement gears.

The configuration of the internal star wheel 85 with respect to the star wheel pinion 79 as shown in Figure 2 is such that the addendums of the teeth on one are radially opposite the dedendums of the other. As has been explained, the star wheel pinion and internal star wheel at all times rotate together, their only relative motion being along their common axis. A pawl 91 is normally held by a finger 92 in a position to be meshing with the teeth of the star wheel pinion 79. Finger 92 is pinned to a lever 93 attached to be rotated about fulcrum 94 by means of a stepping solenoid arm 95 actuated by stepping solenoid 96. Normally, stepping solenoid 96 is energized to hold the pawl 91 engaged in the teeth of the star wheel pinion 79 (against the action of a holding spring 90) and in doing so locks the star wheel pinion 79 and internal star wheel 85 against rotation as an assembly 89. When the stepping solenoid 96 becomes deenergized, the driving motor 76 becomes energized at the same instant and pawl 91 is retracted radially outward by the spring action of spring 90 on finger 92.

For the stepping operation of the angle setting device, i.e. when it is desired to rotate the prism 6 in incremental angles, internal star wheel 85 is in the same plane as internal star wheel pinion 79 and thus when pawl 91 is retracted radially outward it engages a tooth of the internal star wheel. Simultaneously with the deenergization of stepping solenoid 96, the motor 76 becomes energized; and dependent on the sense of rotation of the motor, pawl 91 is caused to be moved either to one side-face or the other of the radial opposite tooth of the internal star wheel 85.

As noted by referring to Figure 2, the spacing of the teeth of the internal star wheel is greater than the circumferential width of the pawl 91 thus permitting the escapement assembly 89, by the above action, to be rotated a small increment until the pawl 91 engages the face of the succeeding tooth of the internal star wheel 85. The cam action of this face then acts to return the pawl 91 radially inward toward the star wheel pinion 79. At some instant during this engagement and after the pawl 91 has been driven within the mesh of the star wheel pinion 79, the motor is deenergized as the stepping solenoid 96 is re-energized. Again the pawl is driven radially toward the star wheel pinion 79, this time by the pull of the stepping solenoid 96. In so doing, the pawl 79 engages the succeeding face of the tooth of the star wheel pinion and by cam action rotates the escapement assembly until the pawl locks. The escapement gear assembly 89 is now again locked in position after having rotated one fixed increment.

Referring again to Figure 2 it can thus be seen that the radial length of pawl 91 must be such that it is just less than the difference between the radii determined by the dedendum of the teeth of the star wheel pinion 79 and the addendum of the teeth of the internal star wheel 85 since it must be able to pass between the teeth of the two gears when they are in the same plane.

The escapement gear assembly 89 just described is positioned in escapement housing 77 on the axis of motor mounting hole 103 through which motor shaft 78 extends. Idler gears 97 and 98 designated the prism idler and the counter idler respectively are also fixed in the escapement housing 77, their shafts being rotatably mounted in bearing holes 99 and 100 respectively in the inside base of the escapement housing 77. The cutouts on either side of the yoke 87 permit these idlers 97 and 98 to mesh with drive pinion 82 by which they are driven. To complete the preferred embodiment of the gear train for the angle setting device an adjustable idler gear 101, meshing with lead screw gear 75 and prism idler gear 97, is mounted on an adjustment bracket 102 by which it can be assembled and positioned along an adjustment slot 104, cut in the base of escapement housing 77, so as to eliminate any backlash in the gear train.

It can thus be seen that the mode of drive for the gear train is such that motor 76 drives through drive pinion 82, prism idler gear 97, adjustment gear 101, lead screw gear 75, jack screw gear 62, and finally cam gear 58.

A counter idler 98, also driven by drive pinion 82, drives a counter shaft pinion 106 of a star altitude resetting counter 107 that is attached to the far side of housing 4. The operation and use of the star altitude resetting counter will be described hereafter.

In the final assembly of the preferred embodiment of the angle setting device, escapement housing 77 is attached by attachment screws 84 below angle generator housing bottom 41 to the rear of a prism hole 108 provided therein. The purpose of prism hole 108 is for permitting a collimated source of light, such as a star and a restricted adjacent field, which is picked up by the optical surface of dove prism 6 to be reflected therethrough into an objective of an associated optical system.

Reference is made next to Figure 3 which is a plan view, partly in section, showing the cross section of the calibration cam assembly 42, jack screw assembly 43, and lead screw assembly 44, together with radius arm 27.

Referring first to the jack screw assembly 43, on jack screw 59 a cam follower 115 is held by a cam follower bracket 116 which together with the arm 117 of cam follower 115 forms a threaded hole which engages the threads of jack screw 59 and is actuated thereby to be moved along the jack screw. Cam finger 118 of cam follower 115 rests on the radius button head screws 47 threaded into the helical channel of cam barrel 46. The thread barrel finger 119 of cam follower 115 holds follower screw 120 with a bearing ball 121 mounted on its end which rests on a plate cam 122. Cam 122 is secured to a support 123 extending, for example, the full length of thread barrel 65.

Thus the cam follower 115 rocks about its pivot on jack screw 59 in accordance with the radial height of radius button screws 47 on the helical cam barrel 46. Barrel spring 125 which connects thread barrel 65 to housing 4 exerts a moment which yieldingly urges the thread barrel 65 to rotate about its axis in accordance with the rocking motion of the cam follower 115 and its contact with plate cam 122.

Figure 4 shows an exploded view of the traveling carriage assembly 124 for lead screw 64. Here traveling tooth segment 126 is shown to be integral with segment arm 127. Flat spring 128 flexibly connects segment arm 127 to the lower end 129 of a spring holder 130. Spring holder 130 as well as a carriage 131 to which it is attached have central lengthwise slots which permit the segment arm 127 to be rocked therethrough. A tooth segment retaining spring 132 is cantilevered off the lower end 129 of spring holder 130 such that its free end bears against the rear of tooth segment 126 to maintain it at the full depth of the lead screw 64 thread at all times. Between spring holder 130 and carriage 131 a clip spring 133 is held. The clips of clip spring 133 act to hold the slide surfaces 134 of carriage 131 against the ways 135, shown in Figure 3, on the thread barrel 65. Figure 3 also shows that a marcel spring 137 is inserted along one side of the tooth segment 126 to keep tooth segment 126 bearing on the same side way of the thread barrel 65 as it moves along the axis of the lead screw 64.

Figure 5 is a view showing how the rotational motion of the lead screw 64 is precisely transmitted through radius arm 27 to rotate the prism assembly 5.

Carriage 131 and segment tooth 126 are shown assembled in position on the lead screw 64 and thread barrel 65. Radius arm 27 rests on the top of carriage 131 by means of a resting screw 139 which has a bearing ball 140 inserted in its end. A cross locking screw 141 and saw-cut 142 in the end of radius arm 27 insure that the resting screw 139 is firmly locked in position in radius arm 27. A radius arm spring 143, one end of which is attached to an intermediate point on the radius arm and the other end of which is attached to the housing bottom 41, urgingly maintains radius arm 27 in contact with the top of carriage 131 at all times. It is noted that limit switches 136 are located at each end of the thread barrel 65. These switches 136 ensure that the power is cut off when the carriage 131 reaches either end of the angle lead screw 64.

The altitude angle resetting counter 107, shown in Figure 1, is an integral part of the main setting device 1, but has only a specific function at a given time. The counter is attached to the rear of the main frame 4 and is always geared to the motor 76 through counter idler 98. It is a means of storing precomputed numerical data mechanically, which is to be utilized at some future stipulated time. The counter 107 comprises five stages of rotatable discs mounted on an axis within a housing. The housing is constructed so as to expose, for visual presetting purposes, an arc section of each disc stage. In turn each stage is comprised of a wheel actually inscribed with the numbers 0 to 9 inclusive around its periphery; and two other rings (discs) on each wheel having electrical collector rings cast or formed, that are imbedded, into a non-conducting base.

The collector rings, associated brushes, and related wiring scheme comprise the internal circuit of the counter 107. Any time a preselected number appears on the counter, the contact of the brushes with the collector rings is broken. This opens the circuit between the power source and the motor 76 to stop the rotation of the prism 6 at a desired base altitude angle.

The operation of the angle setting device 1 can best be described by reference to Figure 6 which shows the control circuit for the embodiment of the invention in Figure 1. The control circuit includes, in block diagram form, the apparatus that would be needed along with the angle setting device 1, for supplying the precomputed star altitude angle data.

A magnetic tape play-back unit 145, as shown, has two main data storing channels, the sequence channel 146 and the star altitude channel 147. These channels on the magnetic tape hold magnetic pulses that have been previously impressed thereon in such a manner that their spacing, as determined by a time controlled, constant linear play-back speed of the tape, results in a generation of the precomputed electrical control pulses in a manner needed to actuate the angle setting device. Leads 148 from the star altitude channel 147 convey these altitude angle pulses to a gating and phasing device 150. Whenever one of the leads 148 is energized, a gate in device 150 permits a fixed burst of 400 cycles from a power line 151 connected to a reference frequency lead 152 to pass therethrough to a power lead 153. Dependent on which of the leads 148 is energized, this burst of 400 cycles is either plus or minus 90° out of phase with the reference frequency. This phase relation determines the direction of rotation of the torqueing motor 76. The 400 cycle burst is connected by power lead 153 to lower relay 169 of a compound stepping relay 154.

Compound stepping relay 154 which includes lower relay 169, center relay 170, and upper relay 171, is of the gang type; a single pulse emitted from sequence channel 146 momentarily energizes coils 156 and thus steps a contact arm 157 on each of the three stepping relays simultaneously to a successive contact by means of a pawl and ratchet arrangement (not shown). When the star altitude angle channel 147 is generating output pulses which are intended for driving the angle setting device in precise increments, such that the motion is an incremental approximation of a continuous curve of altitude angle with respect to time, the lower relay switch 169 is closed, and switches 170 and 171, being so devised that when lower relay switch 169 is closed by means of the pulse generated by the sequence channel 146, switches 170 and 171, are relatively and simultaneously opened connecting the bursts of 400 cycles through lower relay line 158 and a motor control circuit 161 to the control line 159 of the two phase drive motor 76.

Motor control circuit 161 includes an N.C. motor control switch 160 whose function will be described hereafter. A parallel circuit 165 from lower relay line 158 connects to a 400 cycle A.C. relay 162 which is grounded at 163. Whenever A.C. relay 162 is energized, it opens an N.C. solenoid switch 164. Solenoid switch 164 is in the stepping solenoid circuit 155 and connects one side of stepping solenoid 96 through second N.C. solenoid switch 167 and a D.C. source 166 to the other side of stepping solenoid 96.

Thus in response to a pulse from the star altitude angle channel 147 of the magnetic tape playback unit 145 the stepping solenoid circuit is opened and the pawl 91, which is normally held engaged in the teeth of star wheel pinion 79, is disengaged by the retraction of holding spring 90. Simultaneously the control field of the two phase motor 76 is energized, and since the reference field of the two phase motor is always impressed by the 400 cycle A.C. potential in reference line 152, the motor 76 thus is energized to rotate in a direction in accordance with the phase relation of the 400 cycle burst to the reference frequency. The movement of pawl 91 from the recess of the teeth of star wheel pinion 79 to the recess of the teeth of the internal star wheel 85 hence permits the compound escapement gear assembly 89 to be rotated by the motor 76, a small increment determined by the wider spacing of the teeth in the internal star wheel.

When the 400 cycle pulse ceases, the 400 cycle relay 162 becomes deenergized closing N.C. solenoid switch 164 to again energize stepping solenoid 96 which action moves pawl 91 back into locked engagement with internal star gear 79.

It is thus seen that as each pulse is emitted from the star altitude channel 147 the angle setting device is actuated to drive the prism 6 a fixed angular increment. This completes the operation of the stepping off of small angular increments on the prism in accordance with the star altitude scheduling device as needed for star-tracking of a specified trajectory.

In addition to the above described operation of the angle setting device there is also incorporated in the embodiment and control circuit of the invention a means of making a major angle change in a free run without the stepping interference by the pawl 91. This free run or slewing of the prism about its axis is required in the present embodiment of the invention to reposition the prism for automatic star changeover in flight.

Any time this operation is desired, a pulse from the sequence channel 146 of the magnetic tape play-back unit 145 energizes the coils 156 of compound stepping relay 154. This action, as described, simultaneously switches all three of the stepping relay arms 157 to their next contact. The lower relay 169 of compound stepping relay 154, which for the previous operation connected the star altitude angle channel 147 to the control line 159 of the motor, is now open. The center relay 170, previously open, now routes the connection of reference line 152 from the 400 cycle A.C. source to motor control line 159 through a network composed of a 90° phase lead circuit 174 and a 90° phase lag circuit 175 in parallel, and the internal wiring scheme of the altitude angle resetting counter 107.

The reason for routing the motor power circuit through this network will be explained in the ensuing discussion. The upper relay 171, previously open, now closes a slewing solenoid circuit, not previously mentioned, which contains slewing solenoid 88 and a D.C. power source 173. The slewing solenoid 88 thus becomes energized and its plunger 172 is actuated to open the second N.C. solenoid switch 167 and the N.C. motor control switch 160 which are mechanically connected thereto. The N.C. motor control switch 160 is opened to ensure that the 400 cycle A.C. relay 162, which is in parallel with the energized power motor circuit 161, is disconnected for the slewing operation; and second N.C. solenoid switch 167, which is in the stepping solenoid circuit, is opened to keep the stepping solenoid 96 deenergized and thus permit spring 90 to hold pawl 91 disengaged from star wheel pinion 79 for this operation. Simultaneous with the opening of switches 160 and 167, yoke 87 which is also attached to be actuated by slewing solenoid 88, lifts the internal star wheel 85, attached thereto by bearing 86, out of the plane of the mesh of the star wheel pinion 79. Therefore while the pawl 91 is pulled clear of mesh with the star wheel pinion 79 teeth, the outer star wheel 85 is lifted clear of the plane of the pawl, allowing the uninterrupted slewing or free run operation to take place.

Since the connection between the 400 cycle A.C. source and the motor control line 159 is routed through the counter 107 for the slewing operation above described, and since the counter 107 is geared to the motor 76 through counter idler 98, as shown in Figure 1, at all times, the counter revolves until a null position or counter open-circuit number, which was preset, is reached. The motor circuit is then broken and all operation ceases.

Figure 7 shows the altitude angle setting device 1 in conjunction with a star tracking telescope 109 in a manner as desired for celestial navigation. Here the top of telescope barrel 110 is rigidly connected to encircle prism hole 108 in the bottom of angle generator housing 4. The telescope barrel 110 is then supported near its upper end on a telescope bearing 113 which holds the telescope in substantially a vertical position in a cylindrical housing 111. Housing 111 is integral with and positioned with its axis normal to a table 112, freely mounted in gimbals which is the star-stabilized specified horizontal platform required.

In order to completely define the orientation of the table 112 or horizontal platform as in a celestial navigation set up, two such star tracking telescopes, each equipped with angle setting devices, need to be mounted on table 112. Furthermore each of the tracking telescopes, of which 109 is an example, need be equipped with error sensors or scanners (not shown) preferably positioned inside of the base of telescope barrel 110. These scanners cause any deviation of the tracking star image from a null position thereon to be interrupted into pulses of light. These light pulses are then directed onto light sensitive devices such as photocell 114 shown attached to table 112. The resulting electrical pulses, qualitative of the position-error of the particular telescope with respect to the star, are fed into an associated servo system (not shown) which orients the table 112 (which is freely mounted in gimbals as indicated in Figure 7) in elevation with respect to two orthogonal horizontal axes; and drives the telescope 109 and the angle setting device 1 attached thereon in azimuth so that the chosen stars remain in the center of the fields of view of the telescopes at all times.

It is thus noted that the angle setting devices of the present invention determine the angular setting of the table 112 with respect to each of two prisms pivoted on axes parallel to the plane of the table. The prisms being mounted on telescopes whose optical axes have a fixed relation with respect to the table; but the telescopes themselves being free to rotate in azimuth about their optical axis with respect to the table by means of the associated scanners or error sensors as described above. The specified apparent horizontal plane, which is the plane of the table 112, is thus physically established and maintained in accordance with the requirements of celestial navigation.

It should be noted that the pulses from the magnetic tape playback unit 145 to the elevation drive motor 76 do not represent digital values of the altitude angle between the stellar line and the table 112 or the specified horizontal, but represent changes in value from a given starting point. Therefore, at the start of a celestial navigational flight, the altitude prisms 6 must be set at a particular value and that value in terms of an equivalent counter number used as an initial setting for the altitude angle resetting counter 107. The digits appearing on the counter 107 are used to manually set the altitude prism 6 to the agreed value for initial star pickup—this setting to be done before take-off. When, due to earth rotation plus missile travel around the earth, a star becomes unsuitable and it is necessary to change to a different star, the altitude prism 6 must be then set very accurately to a new initial position. Since the star sequence and timing may be determined in advance of the flight, the setting discs and collector rings in the star altitude resetting counter provide the "memory" means whereby preferably two additional star altitude values, equivalent to two five digit numbers on the counter, may be pre-set into the counter.

The signal from the computer playback sequence channel 146 of the magnetic tape playback unit 145 is then used to initiate the star change-over at the appropriate time. Upon energizing appropriate circuits to the counter, as required for the slewing operation, the counter 107 is placed in control of the elevation drive motor 76 and drives the prism 6 until the predetermined altitude value i.e. counter number is reached at which time the circuit connecting the motor 76 to the reference frequency line 152 is broken by collector ring action and all operation ceases.

The star angle generator and drive, in the preferred embodiment of the invention, is designed to lay off the angle of the specified-apparent horizontal with respect to a stellar line in very precise, minute, increments. This is accomplished by making each input pulse from the magnetic tape playback unit and hence each discrete motion of the lead screw 64 equal to .0000125 of the sine function. This theoretically gives an error of prism 6 setting of not greater and generally less than 2 seconds of arc over a desired range of 270,000 seconds of arc.

By using practical machining methods, the pitch lead of the lead screw 64 can be made to vary not more than .0004 inch over its entire length.

This error plus others resulting from prism and mechanical misalignments, due to either finished surfaces or offcenter errors or in assembling the component parts, require that correcting adjustments must be made. These corrections, as a whole, are made by means of the helical incremental calibration-correction cam 42 operating differentially, through the traveling nut segment 126. Lapped conical bearings, spring loaded axially, and spring loading of all moving parts are other advantageous features that have been employed for obtaining the desired accuracy through elimination of back-lash and reducing other hysteresis and random errors.

The design of the traveling nut of the carriage assembly 124 is unique in that only a projected tooth segment 126 rests in the groove (thread) of angle setting lead screw 64 in contrast to the use of several threads, as in a conventional nut. While the random errors in a span of threads, such as irregularities in pitch, lead, and pitch diameter, tend to cause a variation of motion relative to the axis of the screw in a consistently different configuration for each complete rotational pass, the tooth segment 126, to the contrary, riding only opposing faces of a thread groove over a short arc, encounters the identical irregularities when passing a given arc in either direction. Each such irregularity has a single effect on side thrust or lift of the tooth segment, and therefore, can be precisely corrected by adjustments in the motion of the tooth segment 126 created by calibration cam barrel 46.

Supplementary to the single tooth segment 126 there is provided a mean of support to hold the segment always in the same attitude. Firstly, the tooth segment 126 is flexibly supported in a traveling carriage 131 in such a manner that, as shown in Figure 4, the tooth segment is spring loaded in a radial direction by cantilever spring 132 to ensure that it rides the full depth of the thread on lead screw 64. Secondly, the traveling carriage 131 is supported by and slides axially along the flat polished ways 135 of thread barrel 65 which defines a fixed axis for nut travel substantially parallel to the lead screw axis that will not vary with screw irregularities and rotation. Another manner of supporting the tooth segment 126 as it slides axially up and down the lead screw axis may be a hollow fitting, containing the segment, which rides the polished major diameter surfaces of a lead screw with acme threads. In any event, with errors thus rendered consistent and not random, permanent corrections directly counteracting each error can now be made.

Since the amount of angular tilt of the optic prism 6 about its rotating axis is extremely critical on the accuracy of the celestial navigation system, it will now be made clear how these mechanical imperfections, now cyclically generated, are negated by means of the correction cam mechanism.

This cam mechanism, as previously described, comprises the helical channel cam barrel 46, and the jack screw 59 with a cam follower 115 which travels up and down in unison with the carriage 131. The cam follower 115 is essentially a rocker with the jack screw 59 as its fulcrum. Since the barrel spring 125 is attached to one side of the thread barrel 65 to react to any applied pressure, the cam follower, one finger 119 of which is set against plate cam 122, attached to the thread barrel 65, to cause tension of this spring, is, by the very reaction of the spring, rocked about the jack screw 59 so that its other end, cam finger 118, is held against the cam barrel 46.

The cam barrel 46 is constructed with a spiral flange or wall around its major diameter, the space between concurrent walls being just wide enough to receive the cam finger 118 of the cam follower 115 and act as a supplementary guide. Within the helical channel between the walls, and extending along the entire spiral path of cam barrel 46, a means of adjusting the height or depth of the helical channel is provided by means of radial button head screws 47, the top of whose heads are rounded with a spherical radius to the approximate radius of the cam barrel 46 at the midrange of adjustment.

In operation, the cam barrel rotates at a speed such that the cam finger 118 of the cam follower 115 which rides between the spiral walls will travel vertically without jamming or bending while the cam follower 115 is threading up or down the jack screw 59; in fact, the vertical speed of the carriage 131, the cam follower 115 and the pitch of the cam barrel spiral are identical, the governing factor being the speed of rotation of the angle setting lead screw 64, the jack screw 59, and the cam barrel 46 respectively.

Since infinitesimal flaws may be expected in the optics of the prism and telescope in addition to the mechanical imperfections, prior to useful operation these conglomerate errors must be eliminated by rotating the assembly by revolution or an increment thereof, and adjusting the depth of the barrel spiral channel 48, in this case adjusting the height of the button head screw 47 nearest to the cam follower. This is facilitated, for instance, by means of a master calibration fixture designed to utilize necessary gage blocks to secure an accuracy of the order of one second of arc.

What takes place is this: If, after the rotating components come to a stop where positions of the carriage 131 and consequently the prism 6 are theoretically exact, but the actual positions are inaccurate to the slightest degree, a slight rotation of the carriage 131 on the angle setting screw will cause the carriage to thread itself up or down, thereby raising or lowering the prism radius arm 27 which rests against it. Therefore, if the prism should come to rest too low to observe a given pin point image, at the center of the field of view, the carriage must be rotated slightly in the direction to lower the arm 27 and allow the prism to tilt upward, and vice versa.

Now the degree of rotation of the carriage 131 is governed by the height of the radius button head screw 47 in the cam barrel spiral channel 48 on which cam finger 118 of the cam follower 115 rests. The adjusted height of the button head screws 47 cause the follower to rock against the carriage to a greater or lesser amount to effect the slight rotation of the carriage around the angle setting lead screw 64 which will result in a very minute vertical motion.

It should be noted that the thread barrel finger 119 of cam follower 115 rides against a plate cam 122 attached to the thread barrel 65. This plate cam 122 is so machined as to remove continual or general inaccuracy through the complete range of travel such as the continued increasing or decreasing error resulting from a tilted face 134 on the carriage 131 for example while the cam barrel 46 removes periodic and localized flaws or inaccuracies.

A method of reducing the error of arm length to the smallest amount that may be sensed by the adjustment means is a tongue 29 and slot 30 arrangement in the assembly of the prism arm 27 rendering it adjustable in length. The loss of true vertical travel, therefore, due to a tilted or canted angle setting screw, for example, can be overcome by this means by shortening the effective length of prism arm 27 to increase the rate of rotation.

It is thus clearly seen that the present invention is capable of automatically and precisely setting the angle of a rotated member with respect to a given reference. In tests of this device, the stringent operational accuracy and speed of response, as required for celestial navigation, were satisfactory. It should be noted that modified embodiments of this invention would be useful in automatic surface sextants, surveyor's transits, and other instruments where accurate angular settings are required.

From the above description it will be apparent that there is thus provided a device of the character described possessing the particular features of advantage before enumerated as desirable, but which obviously is susceptible of modification in its form, proportion, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. An angle setting device comprising a pivoted bar, an associated member attached at the pivot of said bar to be rotated therewith, a lead screw whose rotating axis is normal to said associated member rotating axis, a thread barrel rotatable on the same axis as but independently of said lead screw, said thread barrel having an axial slot exposing the thread of said lead screw, means defining a cam plate on said thread barrel and extending along the length thereof, a carriage adapted to slide along said slot in a path parallel to said screw axis, the free end of said pivoted bar freely supported on said carriage, a tooth segment supported in said carriage to engage said lead screw thread, a jack screw, a cam barrel, the rotating axes of said jack screw and said cam barrel positioned substantially parallel to the axis of said lead screw; a gear train for rotating said lead screw, said jack screw and said cam barrel; a cam follower threadably mounted on said jack screw, one end of said cam follower slidably contacting said cam barrel and the other end slidably contacting said thread barrel cam plate, a spring yieldingly rotating said thread barrel about its axis so as to maintain said contacts of said cam follower, said cam follower rocked about said jack screw in accordance with said cam barrel, said cam follower rotating said thread barrel about the axis of said lead screw against the action of said spring in accordance with said rocking motion, whereby the axial movement of said tooth segment and thereby said carriage along said lead screw is corrected in accordance with said cam barrel.

2. Apparatus in accordance with claim 1 wherein said tooth segment supported in said carriage includes a pivoted arm permitting said tooth segment to be rocked radially into the thread of said lead screw and a spring for urgingly holding said tooth segment to ride the depth of said lead screw thread.

3. Apparatus in accordance with claim 1 wherein said cam barrel has a helical channel extending around the periphery thereof, radial screws positioned adjacent to each other at the bottom of said helical channel for the entire length of its path, one end of said cam follower guided by said channel and bearing against said radial screws, said radial screws to be adjusted in radial position in accordance with the correction desired on the axial travel of said carriage.

4. Apparatus in accordance with claim 1 wherein said cam barrel has a helical channel around the periphery thereof, and said gear train is such that the axial travel of said carriage, said cam follower, and the pitch of said helical channel on said cam barrel are identical.

5. Apparatus in accordance with claim 1 wherein said cam follower slidably contacts said thread barrel cam plate to compensate for errors in angular setting of said associated member.

6. Apparatus in accordance with claim 1 wherein said cam barrel has a helical channel around the periphery thereof, and radial screws adjustable in radial position positioned adjacent to each other at the bottom of said helical channel for the entire length of its path, said radial screws and said helical channel providing the sliding contact for one end of said cam follower; and wherein said thread barrel has a plate cam secured thereto and extending the full length thereof, said plate cam providing the sliding contact of the other end of said cam follower, whereby localized and periodic errors in said carriage travel are corrected by said radial screws and continual errors in said carriage travel are corrected by said plate cam.

7. An angle setting device comprising an element pivoted at one end, an associated member attached at the pivot of said element to be rotated therewith, a screw rotatably mounted, a carriage threadably engaged with said screw, a motor for rotating said screw to move said carriage along said screw, a power circuit for energizing said motor, an escapement device associated with said motor, means for intermittently actuating said escapement device whereby each actuation permits said motor to incrementally rotate said screw, disengaging means operable in response to externally applied power signals to disengage said escapement device from said motor to permit said motor to continuously rotate said screw, the free end of said pivoted element being freely supported on said carriage and movable therewith, a spring attached to an intermediate point on said pivoted element to urgingly maintain said element to bear on said carriage, said carriage and therefore the free end of said pivoted element being moved along said screw in accordance with the direction of rotation of said screw, and means connected to said motor to be driven thereby for breaking said power circuit to said motor when a desired angular setting of said associated member is reached.

8. An angle setting device comprising a pivoted element, an associated member attached at the pivot of said element and rotatable therewith, a lead screw, a thread follower axially movable on said screw, said pivoted element being movable in accordance with axial movement of said thread follower, a gear train, a motor driven to rotate said lead screw through said gear train, adjustable compensating means cooperating with said thread follower to remove inherent inaccuracies in the threads of said lead screw and said thread follower, pulse generating means, an escapement connected to restrain said motor from rotating said screw, means integral with said escapement device intermittently actuated by discrete pulses from said pulse generating source to disengage said escapement to permit said motor to rotate said lead screw a given increment, and disengaging means integral with said escapement and operable in response to external power signals to disengage said escapement device to permit said motor means to rotate said lead screw continuously.

9. An angle setting device comprising a pivoted element, an associated member attached at the pivot of said element to be rotated therewith, a rotatable screw, a nut segment engaging the thread of said screw, a support for said nut segment extending the length of said screw thread and independently rotatable about the axis of said screw, said nut segment being movable along said support when said screw is rotated, one end of said pivoted element being movable in accordance with the movement of said nut segment, rotating error correcting means for controlling the rotational movement of said nut segment support about said screw to counteractively correct for inherent inaccuracies in angular setting of said associated member, a gear train, a drive motor, said drive motor rotating said screw and said error correcting means through said gear train, and means controlling said motor to drive said screw and said error correcting means in discrete increments.

10. An angle setting device comprising a pivoted element, an associated member attached at the pivot of said element to be angularly moved thereby, a rotatable screw, a nut segment engaging the thread of said screw, a support for said nut segment independently rotatable about said screw, said nut segment being movable along said support parallel with the axis of said screw when said screw is rotated, one end of said pivoted element being movable in accordance with movement of said nut segment, and rotatable cam means relatively rotatable with said screw and associated therewith to cyclically control the movement of said nut segment support about said screw to correct for inherent inaccuracies in angular setting of said associated member.

11. An angle setting device comprising a pivoted element, an associated member attached at the pivot of said pivoted element and angularly movable therewith, a rotatable drive screw, a nut segment threadably engaged with said drive screw, a nut segment support rotatable about the axis of said drive screw, said nut segment being movable along the axis of said drive screw in accordance with rotation thereof, said pivoted element being associated with said nut segment and pivotable in accordance therewith, rotatable calibrating means for controlling the rotational movement of said nut segment support about the axis of said drive screw, a gear train, said drive screw and said rotatable calibrating means being geared to be driven by said gear train, a motor for driving said gear train, an external pulse generating source, controlling means actuated by said pulse generating source to control said motor to rotate said drive screw in prescheduled discrete increments, and means operable in response to external power signals to allow said motor to continuously rotate said drive screw.

12. In an angle setting device, the combination of a member to be angularly driven, power operated rotating driving means, and a motion conversion mechanism associated with said member and said driving means to translate said rotating power driving means into linear driving means to drive said member, said motion conversion mechanism including a rotatable drive screw having a thread follower coaxially movable along the extent thereof and adapted to drive said member, an escapement device connected to control said driving means, said escapement device consisting of an internal star wheel and a star pinion coaxially keyed to rotate together in accordance with said driving means, the teeth of said internal star wheel encircling the teeth of said star pinion and in the same plane thereas, a pawl, holding means operable to hold said pawl in engagement with said star pinion to restrain said driving means from rotating said screw, a spring attached to said pawl to move said pawl out of engagement with said star pinion when said holding means is inoperable, to permit said driving means to rotate said screw, said pawl being returned to engagement with said star pinion when said holding means is operable to restrain said driving means from rotating said screw, and actuating means for intermittently operating said holding means, whereby said driving means is controlled to rotate said drive screw in discrete increments.

13. Apparatus in accordance with claim 12 wherein the dedenda of the teeth of said star wheel pinion are radially opposite the addenda of the teeth of said internal star wheel.

14. Apparatus in accordance with claim 12 wherein the radial length of said pawl is made greater than the difference between the radii determined by the addenda of the teeth of said star wheel pinion and the addenda of the teeth of said internal star wheel.

15. Apparatus in accordance with claim 12 wherein the circumferential spacing between the teeth of said internal star wheel is greater than the circumferential width of said pawl.

16. In apparatus of the character described, a platform freely mounted on gimbals, a telescope mounted on said platform with its optical axis normal thereto, said telescope being free to rotate about its optical axis with respect to said platform, a prism rotatably mounted on the top of said telescope on an axis parallel to said platform, the incident light rays from a star being picked up by said prism and reflected into said telescope, means for rotating said telescope about the optical axis thereof, means for changing the angle of said prism with respect to the plane of said platform, said latter means comprising a prism arm pivoted at said prism rotating axis and attached to rotate said prism, a lead screw, a carriage threadably engaged with said screw to be moved along the axis thereof when said screw is rotated, the free end of said pivoted arm adapted to be moved with said carriage, and means for incrementally rotating said screw to rotate said prism in precise increments.

17. Apparatus in accordance with claim 16 wherein the recited means for incrementally rotating said screw comprises a record having recorded thereon star altitude angles with respect to said platform in terms of pulses, means for reproducing said record to provide pulse signals, and means for applying said pulse signals to incrementally rotate said screw as recited.

18. In apparatus of the character described, a lead screw, a thread barrel rotatable on the same axis as but independently of said lead screw, said thread barrel having an axial slot exposing the length of the thread of said lead screw, means defining a cam plate fastened on said thread barrel and extending along the length thereof, a carriage adapted to slide along said slot in a path parallel to said screw axis, a tooth segment supported in said carriage to engage said lead screw thread, a jack screw, a cam barrel, the rotating axis of said jackscrew and said cam barrel positioned substantially parallel to the axis of said lead screw, means for rotating said lead screw, said jack screw and said cam barrel, a cam follower threadably mounted on said jack screw, one end of said cam follower slidably contacting said cam barrel and the other end of said thread barrel, a spring yieldingly rotating said thread barrel about its axis so as to maintain said contacts of said cam follower, said cam follower being rocked about the axis of said jack screw in accordance with said cam barrel, said cam follower rotating said thread barrel about the axis of said lead screw against the action of said spring in accordance with said rocking motion, whereby the axial movement of said tooth segment and thereby said carriage along said lead screw is corrected in accordance with said rocking motion.

19. Apparatus in accordance with claim 18 wherein said tooth segment supported in said carriage comprises a pivoted arm permitting said tooth segment to be rocked radially into the thread of said lead screw, and a spring for urgingly holding said tooth segment to ride the depth of said lead screw thread.

20. Apparatus in accordance with claim 18 wherein said cam barrel has a helical channel around the periphery thereof, radial screws positioned adjacent to each other at the bottom of said helical channel for the entire length of its path, one end of said cam follower being guided by said channel and bearing against said radial screws, said radial screws being adjustable in radial position in accordance with the correction desired on the axial travel of said carriage.

21. Apparatus in accordance with claim 18 wherein said cam barrel has a helical channel around the periphery thereof; and said rotating means being such that the axial travel of said carriage, said cam follower, and the pitch of said helical channel on said cam barrel are substantially identical.

22. Apparatus in accordance with claim 18 wherein said cam follower slidably contacts said thread barrel cam plate, whereby errors in axial travel of said carriage are corrected by said cam plate.

23. In an angle setting device, the combination of a member to be angularly driven, power operated rotating driving means, and a motion conversion mechanism associated with said member and said driving means to translate said rotating driving means into linear driving means to drive said member, said motion conversion mechanism including a rotatable drive screw having a thread follower coaxially movable along the extent thereof, said thread follower being adapted to drive said member, an escapement device connected intermediate said driving means and said motion conversion mechanism, said escapement device comprising an internal star wheel, a star pinion coaxial with said internal star wheel and keyed to rotate therewtih in accordance with said driving means, said star wheel and said star pinion normally being in the same plane but movable out of said plane, the teeth of said internal star wheel encircling the teeth of said star pinion in said same plane, a pawl, holding means operable to hold said pawl engaged in a recess of said star pinion teeth to restrain said driving means from rotating said screw, means for moving said pawl out of engagement with said star pinion and into engagement with said internal star wheel to permit said driving means to rotate said screw, means for intermittently operating said holding means to control said driving means to rotate said screw in discrete increments, actuating means operable to lift said internal star wheel out of plane with said star pinion, and means for simultaneously operating said actuating means and said pawl moving means to permit said driving means to rotate said screw continuously, whereby major angular movement of said member can be made.

24. In an angle setting device, the combination of a member to be angularly driven, power operated rotating driving means, and a motion conversion mechanism associated with member and said driving means to translate said rotating power driving means into linear driving means to drive said member, said motion conversion mechanism including a rotatable drive screw having a thread follower coaxially movable along the extent thereof, an escapement device connected to control said driving means, said escapement device consisting of an internal star wheel and a star pinion coaxially keyed to rotate together in accordance with said driving means, the teeth of said internal star wheel encircling the teeth of said star pinion and in the same plane thereof, a pawl, holding means operable to hold said pawl in engagement with said star pinion to restrain said driving means from rotating said screw, a spring attached to said pawl to move said pawl out of engagement with said star pinion when said holding means is inoperable to permit said driving means to rotate said screw, said pawl being returned to engagement with said star pinion when said holding means is operable, circuitry means for intermittently operating said holding means to control said driving means to rotate said drive screw in discrete increments, and means operable to lift said internal star wheel out of plane with said star pinion, said holding means being simultaneously rendered inoperable, whereby said driving means is released to rotate said drive screw continuously for major angular setting of said member.

References Cited in the file of this patent

UNITED STATES PATENTS

| Number | Name | Date |
|---|---|---|
| 303,327 | Scott | Aug. 12, 1884 |
| 774,515 | Geier | Nov. 8, 1904 |
| 878,759 | Zalinski | Feb. 11, 1908 |
| 1,346,412 | Meitner | July 13, 1920 |
| 1,487,434 | Bold | Mar. 18, 1924 |
| 1,557,944 | Reisbach | Oct. 20, 1925 |
| 1,703,386 | Boykow | Feb. 26, 1929 |
| 1,819,697 | Boudette | Aug. 18, 1931 |
| 2,067,357 | Terry | Jan. 12, 1937 |
| 2,102,587 | Eliel | Dec. 21, 1937 |
| 2,151,094 | Fiorentino | Mar. 21, 1939 |
| 2,155,402 | Clark | Apr. 25, 1939 |
| 2,205,357 | Hagner | June 18, 1940 |
| 2,222,217 | Solinski | Nov. 19, 1940 |
| 2,227,133 | Hall | Dec. 31, 1940 |
| 2,233,915 | Conrad | Mar. 4, 1941 |
| 2,252,032 | Redd | Aug. 12, 1941 |
| 2,362,827 | Joachim | Nov. 14, 1944 |
| 2,369,622 | Toulon | Feb. 13, 1945 |
| 2,381,478 | Zukor | Aug. 7, 1945 |
| 2,389,142 | Esval et al. | Nov. 20, 1945 |
| 2,484,049 | Putt | Oct. 11, 1949 |

FOREIGN PATENTS

| Number | Country | Date |
|---|---|---|
| 495,224 | France | June 21, 1919 |
| 408,394 | Great Britain | Apr. 12, 1934 |